March 14, 1967    E. WILSON    3,308,598

PANEL BINDING STRIP

Filed Dec. 4, 1963

INVENTOR.
EDGAR WILSON
BY Pearce & Schaeperklaus
Attorneys 3,308,598
PANEL BINDING STRIP
Edgar Wilson, Greensburg, Ind., assignor to Textron, Inc.,
Providence, R.I., a corporation of Rhode Island
Filed Dec. 4, 1963, Ser. No. 327,993
2 Claims. (Cl. 52—717)

This invention relates to a trim strip for use in the upholstery art for holding a cover sheet of finish upholstery material in place upon a backing frame or panel.

In the forming of interior panels of vehicles, it is usual to attach upholstery material to a frame board or the like, over which the material must be tensioned or held taut. An object of this invention is to provide a trim strip which can readily be mounted on such a frame board and which cooperates with the upholstery material to hold the material taut and free from unevenness and puckering.

Such backing boards often have irregular or curved edges, and a further object of this invention is to provide such a trim strip which can be mounted on and can readily be formed or shaped to follow such a curved edge.

A further object of this invention is to provide such a trim strip which has means mounted thereon for attaching a panel consisting of backing board, trim strip and upholstery material to a frame of an automobile door, or the like.

The above and other objects and features of the invention will be apparent to those skilled in the art to which this invention pertains from the following detailed description and the drawing, in which.

In the following detailed description, and the drawing, like reference characters indicate like parts.

Figure 2:
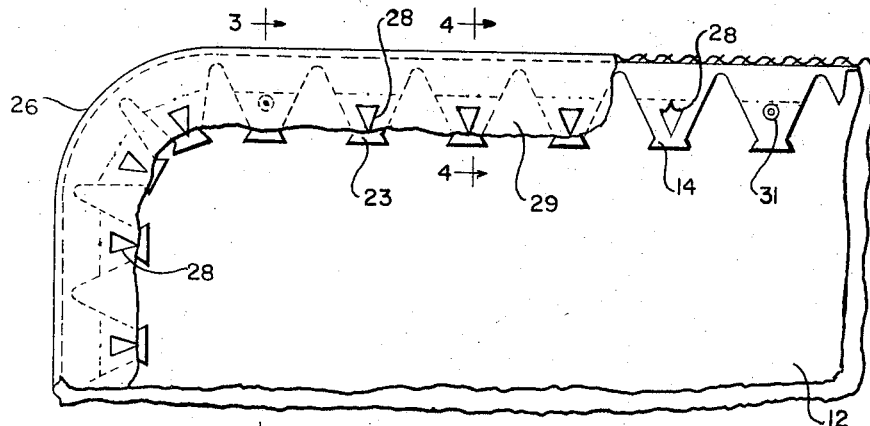
FIG. 2 is an enlarged fragmentary view, partly in side elevation and partly broken away and in section, showing details of construction of the panel illustrated in FIG. 1.
Figure 3:
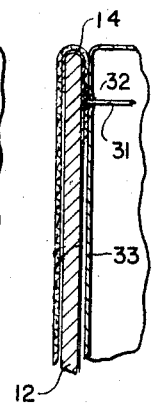
FIG. 3 is a view in section taken on the line 3—3 in FIG. 2, a portion of a frame of an automobile door being shown in association with the panel.
Figure 1:
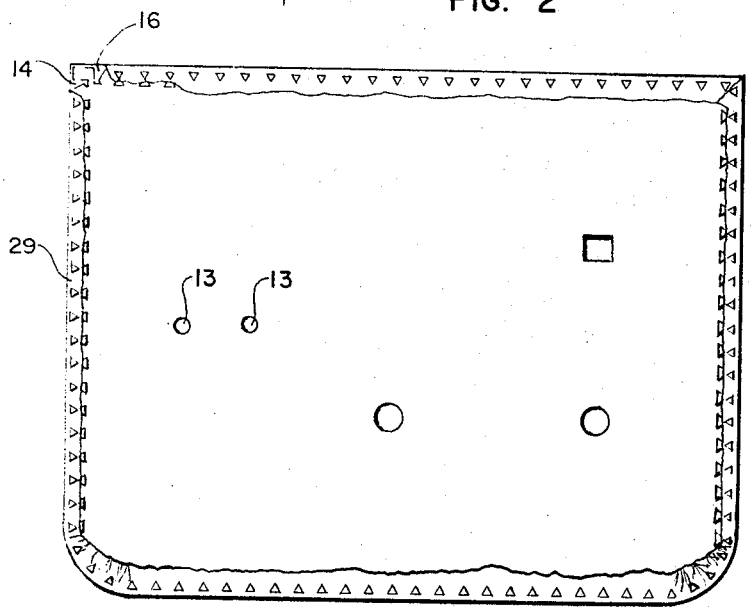
FIG. 1 is a view in side elevation of an upholstered panel for use on the interior of an automobile door, a portion being broken away to reveal details of construction.

In FIG. 1 is illustrated a finishing panel 10 for the interior of a door of an automobile. The panel 10 includes a backing or frame board 12 provided with openings 13 for receiving cranks and the like (not shown) for operating the door, windows, and for other usual purposes. The backing board 12 can be formed of heavy fibreboard or the like. On edges of the backing board 12 are mounted a U-shaped trim strip 14 and a substantially straight trim strip 16, both of which are constructed in accordance with an embodiment of this invention.

Figures 4, 6:
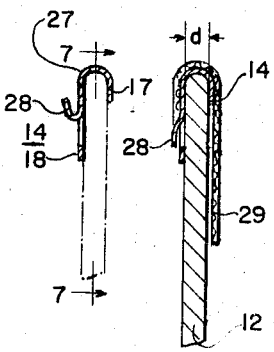
FIG. 4 is a view in section taken on the line 4—4 in FIG. 2.
FIG. 6 is a view in section taken on the line 6—6 in FIG. 5.
Figure 5:
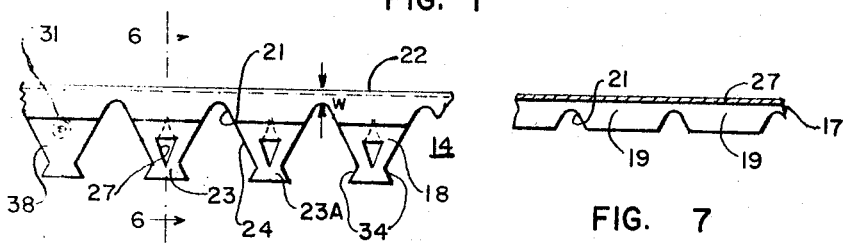
FIG. 5 is a view in side elevation showing a fragmentary portion of the trim strip illustrated in FIGS. 1 to 4, inclusive, removed from the backing board.
Figure 7:
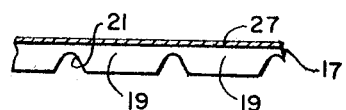
FIG. 7 is a view in section taken on the line 7—7 in FIG. 6.

Details of construction of the strip 14 are shown in FIGS. 2 to 7, inclusive. The strip 14 is formed from a strip of sheet metal and is formed to a generally J-shape, as shown in FIG. 6, with the space between arms 17 and 18 thereof spaced to receive an edge of the backing board 12 therebetween. As shown in FIG. 7, the short arm 17 of the strip 14 is divided into a plurality of tabs 19 separated by generally V-shaped slots 21 which extend nearly to a base portion 27 of the strip which extends between the arms thereof. Similarly, the longer arm 18 of the strip is divided into a plurality of tabs 23 (FIG. 5) separated by generally V-shaped slots 24 which extend nearly to the base portion 22 of the strip. The slots 21 and 24 are aligned, as shown in FIG. 5. This construction makes it possible for the strip to be mounted on the backing board 12 and to be bent around curved portions of the edge, as indicated at 26 in FIG. 2.

Certain of the tabs 23A are cut away as indicated at 27 in FIG. 5 to form prongs 28 (FIG. 6) on which edges of a sheet of upholstery material 29 (FIGS. 1, 2, and 4) are mounted, the prongs being bent from the FIG. 6 position to the FIG. 4 position when the material is mounted thereon to hold the material in taut condition as the material covers the backing board 12. On certain other tabs 23B are mounted nail fasteners 31, which can be attached thereto by welding or the like. The nail fasteners 31 can extend through slots 32 (FIG. 3, only one of which is shown) in a main door frame 33 to attach the panel 10 to the door frame. The nail fasteners 31 can be provided with surface roughening (not shown) to cause firmly gripping thereof in the slots 32.

Preferably, the spacing $d$ (FIG. 4) between arms 17 and 18 of the strip is greater than the width $w$ (FIG. 5) at the bases of the slots so that the strip can readily be bent around curved edges of the backing board, and preferably the spacing $d$ is approximately twice the width $w$. Sidewise extending portions 34 at free ends of the tabs 23 limit the extent of bending between adjacent pairs of tabs 23 so that the degree of bending is insufficient to substantially distort the strip at the locations of bending and the bending is limited to a predetermined degree short of full closing of the slots.

The trim strip illustrated in the drawing and described above is subject to structural modification without departing from the spirit and scope of the appended claims.

What is claimed is:
1. A trim strip for attaching a cover sheet to a frame of a panel which comprises a body substantially J-shaped in section and including spaced arms and a base connecting the arms, each of said arms having a plurality of spaced substantially V-shaped slots therein dividing the arms in a plurality of tabs, the slots in the arms being aligned, the spacing between arms being sufficient to receive an edge of the panel frame and being greater than the distance from the base to apexes of the slots, the strip being yieldable at the apexes of the slots to follow the contour of the panel frame, means at free ends of the tabs of one of the arms extending sidewise therefrom for engaging adjacent tabs to limit bending to a predetermined degree short of full closing of the slots, means on the tabs of one of the arms for attaching the cover sheet thereto and means on tabs of said one of the arms for attaching the panel to a main frame.

2. A trim strip for attaching a cover sheet to a frame of a panel which comprises a body substantially J-shaped in section and including spaced arms and a base connecting the arms, one of said arms being substantially longer than the other of said arms, each of said arms having a plurality of spaced substantially V-shaped slots therein dividing the arms into a plurality of tabs, the slots in the arms being aligned, the spacing between arms being sufficient to receive an edge of the panel frame and being greater than the distance from the base to apexes of the slots, the strip being yieldable at apexes of slots to follow the contour of the frame, prongs on certain of the tabs of the longer of the arms for attaching the cover sheet thereto and nail-like fasteners mounted on certain other tabs of said longer one of the arms for attaching the panel to a main frame.

(References on following page)

References Cited by the Examiner

UNITED STATES PATENTS

| | | | |
|---|---|---|---|
| 1,739,943 | 12/1929 | Bolender | 52—717 X |
| 1,889,903 | 12/1932 | Place | 52—511 |
| 1,903,469 | 4/1933 | Meader | 24—73.8 |
| 1,912,416 | 6/1933 | Van Ausdol | 52—511 |
| 2,274,662 | 3/1942 | Briggs | 52—85 |
| 2,668,399 | 2/1954 | Kingsbury | 85—13 |

FOREIGN PATENTS 1,186,436    1959    France.

FRANK L. ABBOTT, *Primary Examiner.*

JOHN E. MURTAGH, *Examiner.*

RICHARD W. COOKE, *Assistant Examiner.*